United States Patent
Ohmori et al.

(10) Patent No.: US 7,406,361 B2
(45) Date of Patent: *Jul. 29, 2008

(54) RAPID PROTOTYPING METHOD AND APPARATUS USING V-CAD DATA

(75) Inventors: Hitoshi Ohmori, Wako (JP); Masahiro Anzai, Wako (JP); Kiwamu Kase, Wako (JP); Hideo Tashiro, Wako (JP); Akitake Makinouchi, Wako (JP)

(73) Assignee: Riken, Saitama (JP)

( * ) Notice: Subject to any disclaimer, the term of this patent is extended or adjusted under 35 U.S.C. 154(b) by 536 days.

This patent is subject to a terminal disclaimer.

(21) Appl. No.: 10/486,653

(22) PCT Filed: Aug. 14, 2002

(86) PCT No.: PCT/JP02/08268

§ 371 (c)(1),
(2), (4) Date: Aug. 24, 2004

(87) PCT Pub. No.: WO03/016031

PCT Pub. Date: Feb. 27, 2003

(65) Prior Publication Data

US 2005/0015173 A1    Jan. 20, 2005

(30) Foreign Application Priority Data

Aug. 16, 2001 (JP) ............................. 2001-246950

(51) Int. Cl.
*G06F 19/00* (2006.01)
(52) U.S. Cl. .................... 700/119; 700/97; 700/98; 700/118; 264/401
(58) Field of Classification Search ................ 700/119, 700/97, 98, 118; 264/401
See application file for complete search history.

(56) References Cited

U.S. PATENT DOCUMENTS 4,092,201 A * 5/1978 Wommelsdorf ............. 156/285

(Continued)

FOREIGN PATENT DOCUMENTS

EP    0 938 949    9/1999

(Continued)

OTHER PUBLICATIONS

EP 1229463, to Kase et al., which discloses storage method of substantial data integrating shape and physical properties.*

(Continued)

*Primary Examiner*—Paul L Rodriguez
*Assistant Examiner*—Carlos Ortiz Rodriguez
(74) *Attorney, Agent, or Firm*—Griffin & Szipl, P.C.

(57) ABSTRACT

V-CAD data is prepared by dividing external data 12 consisting of boundary data of an object into rectangular parallelepiped cells 13 having boundary planes orthogonal to each other in accordance with octree division and separating the respective divided cells into internal cells 13a positioned on the inner side of the object and boundary cells 13b including a boundary face, and a modeling unit quantity of a prototyping material 7 is changed in accordance with sizes of the internal cell 13a and the boundary cell 13b of a modeling portion. The prototyping material 7 is a resin, lumber powder, a low-fusing-point metal, metal powder, ceramics powder or a mixture of a binder and one of these materials, and its modeling unit quantity is set in such a manner that the modeling unit quantity is smaller than a capacity of a corresponding cell and does not protrude from the boundary plane of the cell. As a result, by using the V-CAD data, a program for rapid prototyping can be simplified, and a model production time can be greatly reduced.

5 Claims, 5 Drawing Sheets

U.S. PATENT DOCUMENTS

| | | | |
|---|---|---|---|
| 4,665,492 A * | 5/1987 | Masters | 700/119 |
| 4,694,404 A | 9/1987 | Meagher | |
| 4,710,876 A | 12/1987 | Cline et al. | |
| 4,719,585 A | 1/1988 | Cline et al. | |
| 4,729,098 A | 3/1988 | Cline et al. | |
| 5,095,419 A | 3/1992 | Seiki et al. | |
| 5,166,876 A | 11/1992 | Cline et al. | |
| 5,197,013 A | 3/1993 | Dundorf | |
| 5,303,141 A * | 4/1994 | Batchelder et al. | 700/29 |
| 5,345,490 A * | 9/1994 | Finnigan et al. | 378/4 |
| 5,510,066 A * | 4/1996 | Fink et al. | 264/40.1 |
| 5,517,602 A | 5/1996 | Natarajan | |
| 5,594,652 A * | 1/1997 | Penn et al. | 700/119 |
| 5,748,865 A | 5/1998 | Yamamoto et al. | |
| 5,796,617 A * | 8/1998 | St. Ville | 700/98 |
| 5,807,448 A * | 9/1998 | Nakazawa | 156/58 |
| 6,075,538 A * | 6/2000 | Shu et al. | 345/419 |
| 6,136,252 A * | 10/2000 | Bedal et al. | 264/308 |
| 6,208,545 B1 | 3/2001 | Leedy | |
| 6,214,279 B1 | 4/2001 | Yang et al. | |
| 6,405,095 B1 * | 6/2002 | Jang et al. | 700/118 |
| 6,445,390 B1 * | 9/2002 | Aftosmis et al. | 345/421 |
| 6,471,800 B2 | 10/2002 | Jang et al. | |
| 6,504,742 B1 | 1/2003 | Tran et al. | |
| 6,606,528 B1 | 8/2003 | Hagmeier et al. | |
| 6,618,607 B2 | 9/2003 | Song | |
| 6,627,835 B1 | 9/2003 | Chung et al. | |
| 6,639,597 B1 | 10/2003 | Zwicker et al. | |
| 6,643,560 B2 | 11/2003 | Shimomura | |
| 6,968,075 B1 | 11/2005 | Chang | |
| 6,982,710 B2 | 1/2006 | Salomie | |
| 7,088,363 B2 | 8/2006 | Kase et al. | |
| 7,110,852 B2 | 9/2006 | Ohmori et al. | |
| 2002/0004713 A1 | 1/2002 | Wakabayashi et al. | |
| 2002/0055692 A1 | 5/2002 | Tanaka et al. | |
| 2002/0113331 A1 * | 8/2002 | Zhang et al. | 264/40.1 |
| 2003/0001836 A1 * | 1/2003 | Ernst et al. | 345/419 |
| 2004/0267400 A1 | 12/2004 | Ohmori et al. | |
| 2006/0228248 A1 * | 10/2006 | Larsson | 419/6 |

FOREIGN PATENT DOCUMENTS

| | | |
|---|---|---|
| EP | 1 229 463 | 8/2002 |
| JP | 02-236677 | 9/1990 |
| JP | 03-021432 | 1/1991 |
| JP | 04-075850 | 3/1992 |
| JP | 06-315849 | 11/1994 |
| JP | 06-348862 | 12/1994 |
| JP | 07-057089 | 3/1995 |
| JP | 07-334541 | 12/1995 |
| JP | 10-063873 | 3/1998 |
| JP | 11-096400 | 4/1999 |
| JP | 2000-182081 | 6/2000 |
| JP | 2000-194881 | 7/2000 |
| JP | 2000-340476 | 12/2000 |
| JP | 2001-022961 | 1/2001 |
| JP | 2001-025023 | 1/2001 |
| JP | 2001-225393 | 8/2001 |
| JP | 2001-370040 | 12/2001 |
| JP | 2002-024306 | 1/2002 |
| JP | 2002-230054 | 8/2002 |
| WO | 02/23408 A1 | 3/2002 |

OTHER PUBLICATIONS

Brunet et al., "Solid representation and operation using extended octrees", Polytechnical University to Catalonia, ACM Transaction on Graphics, vol. 9, No. 2, Apr. 1990, pp. 170-197.*

Wallin, Ake, "Constructing Isosurfaces from CT Data", IEEE Computer Graphics & Applications, 1991 IEEE.*

Pfister et al., Cube-4—Scalable Architecture for Real-Time Volume Rendering, 1996 IEEE.*

Kobbelt et al., "Feature Sensitive Surface Extraction from Volume Data", ACM SIGGRAPH, Aug. 12-17, 2001.*

Office Action issued in related U.S. Appl. No. 10/482,919 dated Feb. 7, 2007.

Hoffmann, Christoph M., "The Problems of Accuracy and Robustness in Geometric Computation", Mar. 1989, pp. 31-41.

Navazo, I. et al., "A Geometric Modeller based on the Exact Octtree Representation of Polyhedra", Computer Graphics Forum 5, pp. 91-104, 1986.

Navazo, I., "Extended Octtree Representation of General Solids with Plane Faces; Model Structure and Algorithms", Comput. & Graphics, vol. 13, No. 1, pp. 5-16, 1989.

Yonekawa, Kazutoshi et al., "A Geometric Modeler by Using Spatial Partitioning Representations," Jan. 1996, vol. 37, No. 1.

Avila, Ricardo S., et al., "A Haptic Interaction Method for Volume Visualization," Oct. 27, 1996, pp. 197-204.

Ayala, D., et al., "Object Representation by Means of Nonminimal Division Quadtrees and Octrees," ACM Transactions of Graphics, Jan. 1985, pp. 41-59, vol. 4, No. 1.

Kela, Ajay, "Hierarchical octree approximations for boundary representation-based geometric models," Computer-Aided Design, Jul./Aug. 1989, No. 6, London.

Lorenson, William E., et al., "Marching Cubes: A High Resolution 3D Surface Construction Algorithm," Computer Graphics, Jul. 1987, pp. 163-169, vol. 21, No. 4.

Roy, U., et al., "Computation of a geometric model of a machined part from its NC machining programs," Computer-Aided Design, 1999, pp. 401-411, No. 31.

Shute, Gary, "Overview of C Programming," Aug. 23, 1999, http://www.d.umn.edu/~gshute/C/overview.html, last printed Nov. 1, 2004.

Yamaguchi, K. et al., "Computer-Integrated Manufacturing of Surfaces Using Octree Encoding," Jan. 1984, pp. 60-62.

Zesheng, Tang, "Octree Representation and Its Applications in CAD," Journal of Computer Science and Technology, 1992, pp. 29-38, vol. 7, No. 1.

International Search Report, completed Nov. 19, 2003, in the Japanese Patent Office and mailed Dec. 3, 2002.

Office Action issued in related U.S. Appl. No. 10/505,224, dated Jan. 24, 2007.

Haley, Michael B., "Incremental Volume Rendering Using Hierarchical Compression," Eurographics '96 vol. 15, No. 3, 1996, pp. 45-55.

Ward, Gregory J., "The Radiance Lighting Simulation and Rendering System," Computer Graphics Proceedings, Annual Conference Series, 1994, pp. 459-472.

Roy, Uptal et al., "3-D Object Decomposition with Extended Octree Model and its Application in Geometric Simulation of NC Machining," Robotics and Computer-Integrated Manufacturing 14, 1998, pp. 317-327.

Shepard, M.S. et al., "Parallel Automatic Adaptive Analysis," Parallel Computing 23, 1997, pp. 1327-1347.

European Search Report issued in related application No. EP 02743831.6, completed Mar. 23, 2007 and mailed Apr. 3, 2007.

Okamoto, Katsunari et al., "Stress Analysis of Optical Fibers by a Finite Element Method," Oct. 1981, IEEE vol. QE-17, No. 10, pp. 2123-2129.

Office Action issued in related U.S. Appl. No. 10/482,919, dated Jun. 29, 2007.

Ramesh, R., et al. "Error compensation in machine tools—a review Part 1: geometric, cutting-force induced and fixture-dependent errors," International Journal of Machine Tools & Manufacture 40 (2000) pp. 1235-1256.

Liu, Qing, "Form-Accuracy Analysis and Prediction in Computer-Integrated Manufacturing," International Journal of Machine Tools & Manufacture, vol. 37, No. 3, 1997, pp. 234-248.

Supplementary European Search Report issued in related application No. EP 02 76 0631, completed Sep. 12, 2007.

* cited by examiner

RAPID PROTOTYPING METHOD AND APPARATUS USING V-CAD DATA

This is a National Phase Application in the United States of International Patent Application No. PCT/JP02/08268 filed Aug. 14, 2002, which claims priority on Japanese Patent Application No. 246950/2001, filed Aug. 16, 2001. The entire disclosures of the above patent applications are hereby incorporated by reference.

BACKGROUND OF THE INVENTION

1. Technical Field of the Invention

The present invention relates to a rapid prototyping method and apparatus using V-CAD data, which can store entity data combining a shape and a physical property with a small storage capacity.

2. Description of the Related Art

The rapid prototyping is also referred to as a photo-solidification modeling method or stereolithography, and generally creates a three-dimensional object by solidifying a photo-curing resin with light.

FIGS. 1A to 1D are principle views of the rapid prototyping. (A) data of a three-dimensional model 1 produced by three-dimensional CAD or X-ray CT is horizontally sliced by a computer in order to generate cross-sectional shape data. (B) a liquid surface of a liquid photo-curing resin 2 is irradiated with a scanning laser beam 3 along slice data. The photo-curing resin is cured in such a manner that only a part irradiated with the laser beam has a given thickness. In this manner, a solidified layer 4 according to the cross-sectional shape data is formed. (C) Then, a table 5 having the solidified layer 4 (shaped object) mounted thereon is moved by only a distance corresponding to a pitch with which the model 1 was sliced, and an uncured thin resin layer is formed on the upper surface of the solidified layer. At this moment, a flattening operation called recoat is usually performed by using a member called a blade, and the surface of the uncured resin liquid is evenly smoothed. Subsequently, the surface is likewise irradiated with the scanning laser beam 3 according to the cross-sectional shape, and the solidified layer is united with the preceding solidified layer 4. (D) By repeating the steps B and C, the target three-dimensional model is created.

The above-described rapid prototyping is characterized in that a three-dimensional object can be created from the CAD data without using a mold, and used in many fields such as production of a master model for precision casting or the like, manufacture of a map or a stereo object and others.

However, the above-described conventional rapid prototyping has a problem that not only steps on the surface of a finished three-dimensional object become large when a slice pitch of the model is roughened but production requires more than several days. Further, on the contrary, when the slice pitch is set small and the solidified layer per one process is thinned in order to increase the precision of the object to be created, not only a program for the rapid prototyping is complicated but introducing of the uncured liquid becomes difficult due to surface tension, and the recoating time becomes long or a remaining surface of recoat is generated.

SUMMARY OF THE INVENTION

On the other hand, the inventors of the present invention and others invented and filed a "method of storing entity data" by which entity data combining a shape and a physical property with a small storage capacity (Japanese Patent Application No. 025023/2001, not laid-open).

This method of storing entity data divides external data consisting of boundary data of an object into rectangular parallelepiped internal cells and boundary cells having boundary planes orthogonal to each other in accordance with octree (oct-tree) division, and stores various physical properties for the respective cells. By this method, a shape, a structure, physical information and history of an object can be managed in an integrated fashion, data concerning a series of processes such as design, processing, assembling, test, evaluation and others can be managed with the same data, and CAD and simulation can be integrated. It is to be noted that the entity data combining the shape and the physical property is referred to as "V-CAD data".

The present invention has been contrived in order to solve the above-described problems by using this method. That is, it is an object of the present invention to provide a rapid prototyping method and apparatus which can simplify a program for rapid prototyping and greatly reduce a model production time.

According to the present invention, there is provided a rapid prototyping method using V-CAD data, comprising the steps of: preparing V-CAD data by dividing external data (12) consisting of boundary data of an object (1) into rectangular parallelepiped cells (13) having boundary planes orthogonal to each other in accordance with octree division and separating the respective divided cells into internal cells (13a) positioned on the inner side of the object and boundary cells (13b) including a boundary face; and changing a modeling unit quantity of a prototyping material (7) in accordance with sizes of the internal cell (13a) and the boundary cell (13b) of a modeling portion.

According to a preferred embodiment of the present invention, the prototyping material (7) is a resin, lumber powder, low-fusing-point powder, metal power, ceramics power, or a mixture of a binder and one of these materials. Furthermore, the modeling unit quantity of the prototyping material (7) is set in such a manner that the modeling unit quantity is smaller than a capacity of a corresponding cell and does not protrude from the boundary plane of the cell.

Moreover, according to the present invention, there is provided a rapid prototyping apparatus using V-CAD data, comprising: a storage device (22) which stores V-CAD data obtained by dividing external data (12) consisting of boundary data of an object (1) into rectangular parallelepiped cells (13) having boundary planes orthogonal to each other in accordance with octree division and separating the respective divided cells into internal cells (13a) positioned on the inner side of the object and boundary cells (13b) including a boundary face; a data generation program (24) which generates a program for manufacturing the object from the V-CAD data by rapid prototyping; a material supply device (26) which supplies a prototyping material (5) while changing its modeling unit quantity in accordance with sizes of the internal cell (13a) and the boundary cell (13b) of a modeling portion; and an NC control device (28) which controls the material supply device based on the data generation program.

According to the method and apparatus of the present invention mentioned above, since the V-CAD data is stored, which is obtained by dividing the external data (12) of the object (1) into rectangular parallelepiped cells (13) having boundary planes orthogonal to each other in accordance with octree division and separating the respective divided cells into the internal cells (13a) positioned on the inner side of the object and the boundary cells (13b) including the boundary face, the external data (12) can be stored by using a small storage capacity as a hierarchy of the cells.

In addition, since the program for manufacturing the object by rapid prototyping is generated based on the V-CAD data, the program can be simplified. Additionally, since the modeling unit quantity of the prototyping material (7) is changed in accordance with sizes of the cells (13a and 13b) of the object (modeling portion), the material is laminated so as not to protrude from the boundary planes of the cells with a relatively large agglomerate of the material which substantially corresponds to a capacity of each cell being determined as a modeling unit. Therefore, the number of all cells is small, and the number of laminations is thus small, thereby greatly reducing the model production time.

Other objects and advantageous features of the present invention will be apparent from the following description in conjunction with the accompanying drawings.

BEST MODE FOR CARRYING OUT OF THE INVENTION

A preferred embodiment according to the present invention will now be described hereinafter with reference to the accompanying drawings.

Figure 1A:
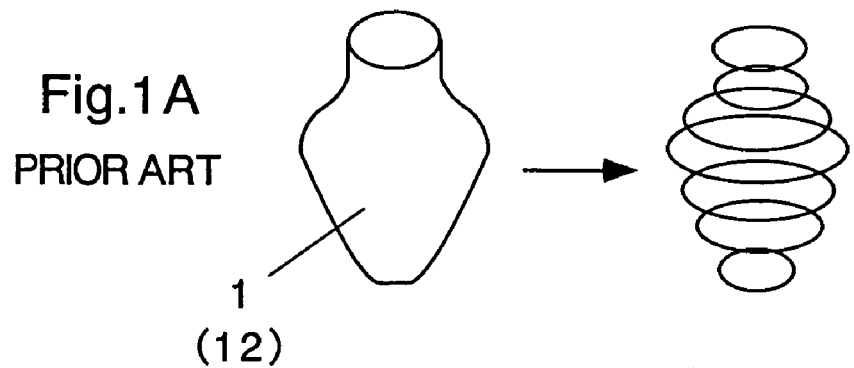
FIGS. 1A to 1D are principle views of conventional rapid prototyping.
Figure 1B:
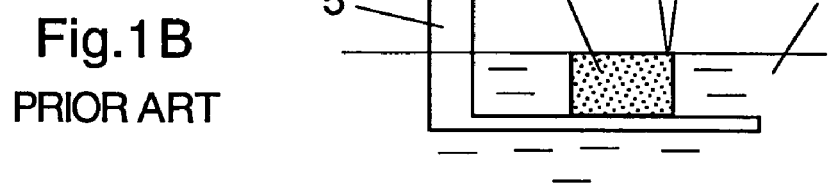
Figure 1C:
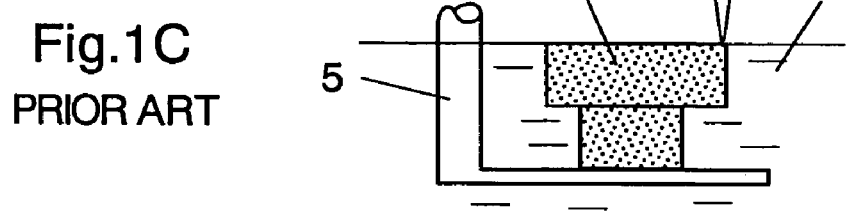
Figure 1D:
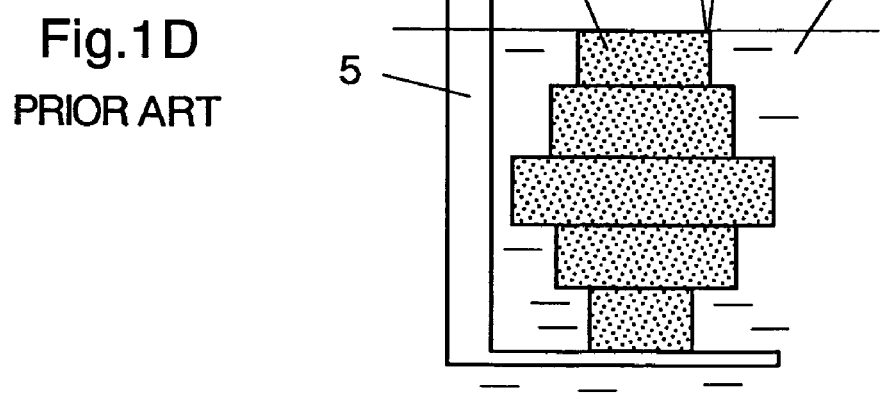
Figure 2:
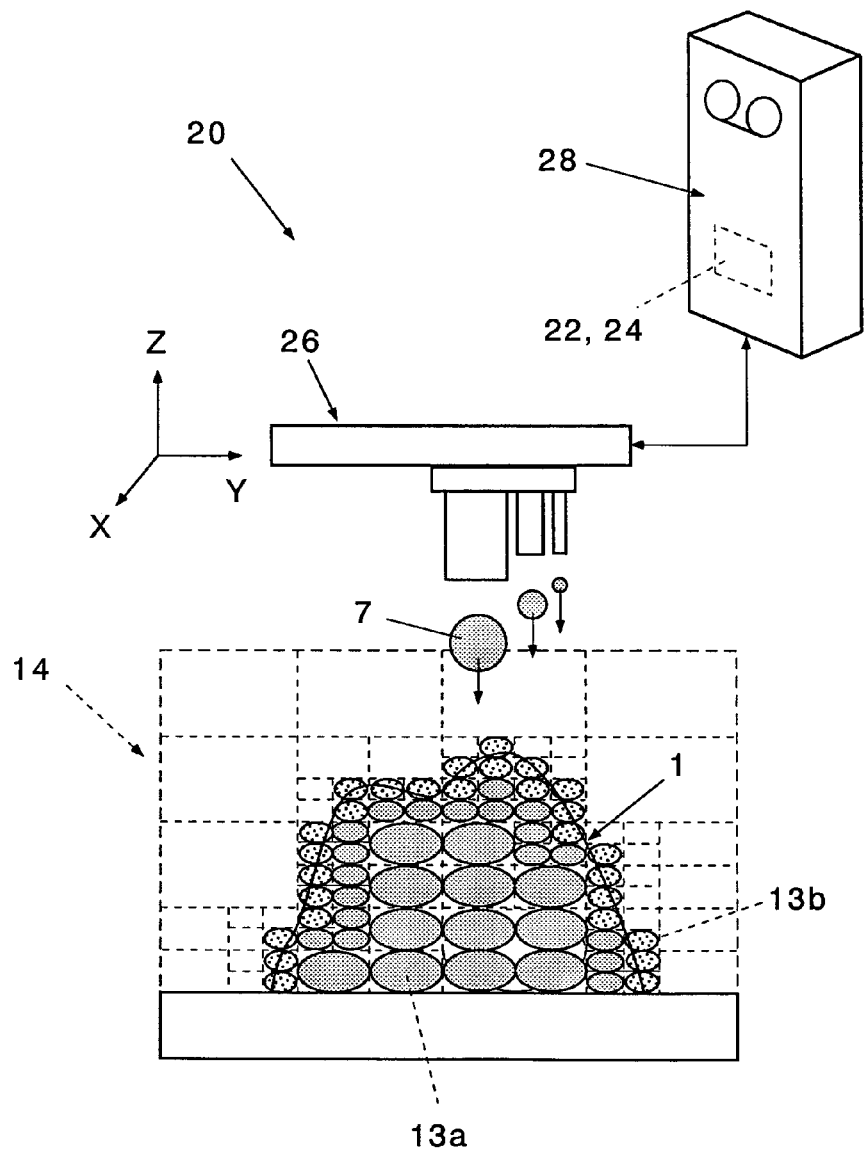
FIG. 2 is a structural view of a rapid prototyping apparatus according to the present invention.

FIG. 2 is a structural view of a rapid prototyping apparatus according to the present invention. As shown in the drawing, the rapid prototyping apparatus 20 according to the present invention includes: a storage device 22 which stores V-CAD data; a data generation program 24 which generates a program used to manufacture an object from the V-CAD data by rapid prototyping; a material supply device 26 which changes a modeling unit quantity of a prototyping material 7 and supplies this material; and an NC control device 28 which controls the material supply device 26.

The storage device 22 stores the V-CAD data 14. This V-CAD data 14 is obtained by dividing external data 12 consisting of boundary data of an object 1 into rectangular parallelepiped cells 13 having boundary planes orthogonal to each other in accordance with octree division and separating the respective divided cells into internal cells 13a positioned on the inner side of the object and boundary cells 13b including a boundary face.

The data generation program 24 generates a program used to manufacture an object from the V-CAD data 14 by rapid prototyping.

The material supply device 26 changes a modeling unit quantity of the prototyping material 7 per cell in accordance with sizes of the internal cell 13a and the boundary cell 13b of a modeling portion and supplies this material thereby allowing the thickness of the prototyping material to vary per cell. The prototyping material 7 is a conventional photo-curing resin, resin or lumber powder including a binder, a low-fusing-point metal (for example, a soldering material), metal powder including a binder, ceramics powder including a binder or the like, and a predetermined modeling unit quantity of the prototyping material is supplied and solidified.

The predetermined modeling unit quantity of the prototyping material 7 is set to a plurality of types in accordance with capacities of the cells in the V-CAD data 14. This modeling unit quantity is set to be smaller than the capacity of the cell in such a manner that the material substantially fills a corresponding cell and does not protrude from the boundary plane of the cell when laminated as shown in FIG. 2.

Additionally, it is preferable that a shape of the prototyping material 7 to be supplied is a sphere or a cube so as to facilitate formation of a desired cubic shape by lamination, and that deformation after supply is small.

The NC control device 28 performs, e.g., triaxial control of X, Y and Z over the material supply device 26 based on the data generation program, laminates the prototyping material 7 and manufactures the object 1 by rapid prototyping.

Figure 3:
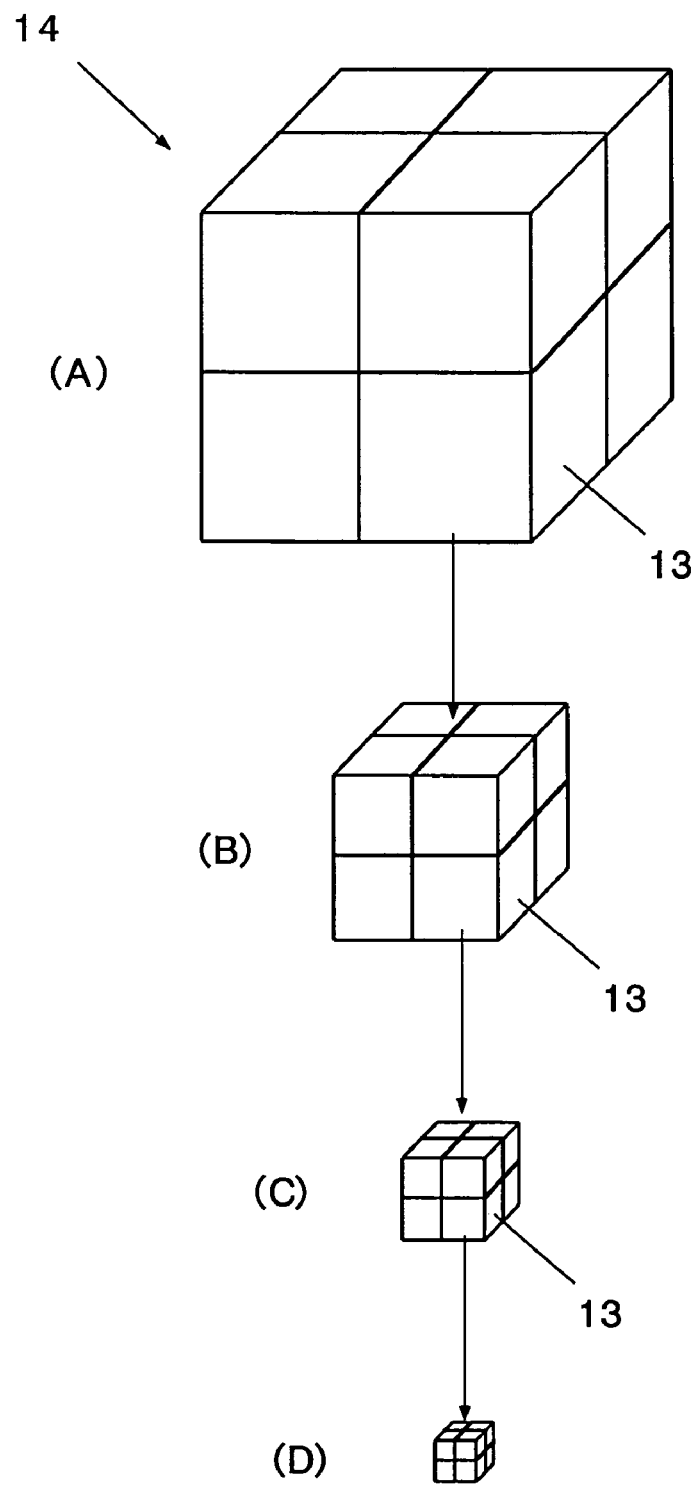
FIG. 3 is an explanatory view of a data structure in a rapid prototyping method according to the present invention.

FIG. 3 is an explanatory view of a data structure in the prototyping method according to the present invention. In the V-CAD data, the modified octree space division is performed. The octree expression, namely, the space division based on octree divides a standard rectangular solid 13 which includes a target solid (object) into eight solids (A) and recursively repeats the eight-part division processing until the solid is completely included in or excluded from each area as shown in (B), (C) and (D). By this octree division, a quantity of data can be greatly reduced as compared with the voxel expression.

One space area divided by the space division based on octree is referred to as a cell 13. The cell is a rectangular parallelepiped having boundary planes orthogonal to each other. The areas occupying in the space are represented by a hierarchical structure based on the cells, the division number or a resolution. As a result, the object in the entire space is represented as superimposition of the cells having the different sizes.

That is, at the octree division step (B), the boundary and the inside physical property are converted into the following entity data 14 (V-CAD data) from the external data 12. The boundary data approximates exactly (for example, in case of a flat plane, it can be exactly reconfigured at three points included therein) or in a specified limit deviation tolerance (a position, a tangent line, a normal line and a curvature, and threshold values specified for the connectivity of them with the neighboring spaces).

A special case of an interpolation curve is a Marching Cube. In the present invention, subdivision is necessarily performed until expression at cut points on an edge line becomes possible and until the normal line or a main curvature and the continuity are satisfied. Furthermore, the surface of the second (quadratic) or lower order is exactly expressed, and a free-form surface is approximated by the surface in the cell based on the flat surface or the surface of the second order, thereby saving only a geometric inherent quantity.

Figure 4:
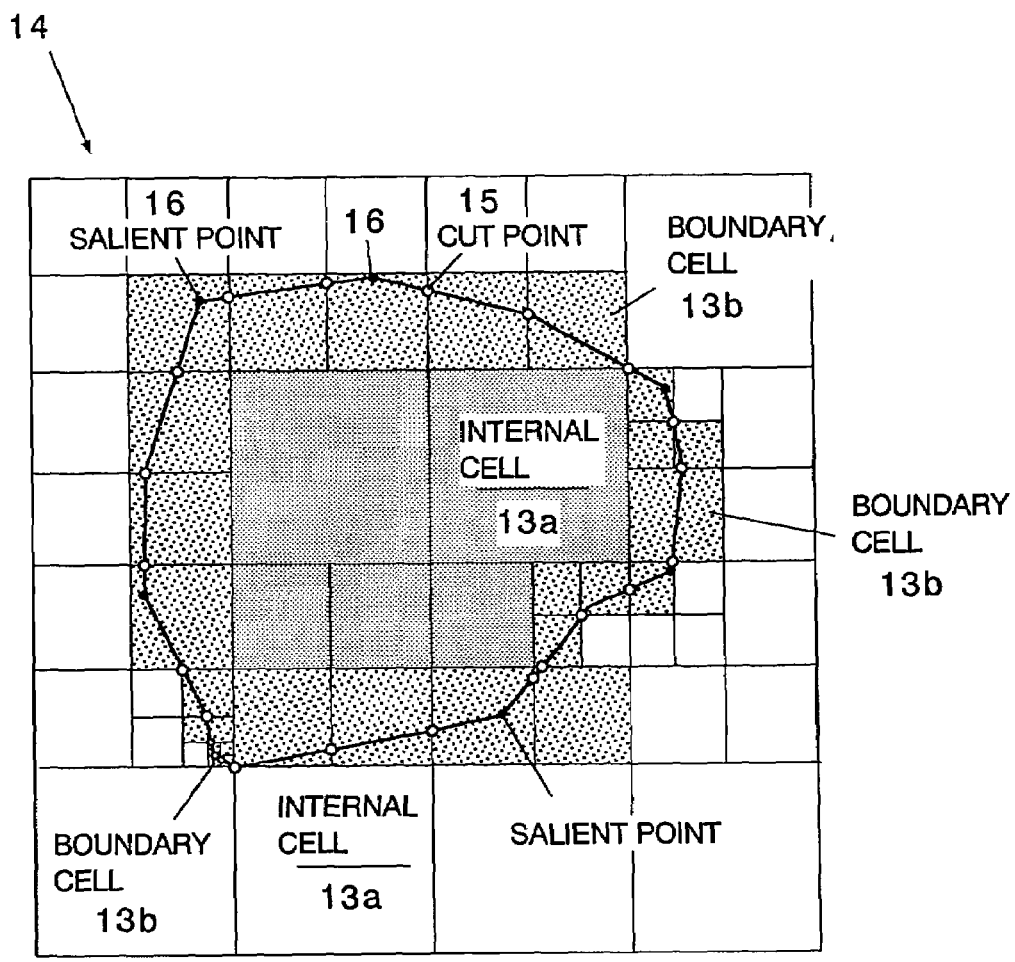
FIG. 4 is a type drawing two-dimensionally showing a division method according to the present invention.

FIG. 4 is a type drawing two-dimensionally showing the division method according to the present invention. In the present invention, the respective divided cells 13 are separated into internal cells 13a positioned on the inner side of the object and boundary cells 13b including a boundary face.

That is, in the present invention, the modified octree is used in order to express the boundary cell 13b, cells which are completely included inside are constituted by the internal cells 13a (rectangular parallelepiped) having the maximum size, and cells including boundary information from the external data 12 are constituted as the boundary cells 13b. Each boundary cell 13b can be exactly or approximately replaced with cut points 15 (indicated by while circle in the drawing) on 12 edges lines in the three-dimensional expression or four edge lines in the two-dimensional expression.

The boundary cell 13b is subjected to octree division until the sufficient cut points 15 can be obtained, with which boundary shape elements constituting the boundaries included in the external data 12 can be reconfigured (exactly with respect to analytic surfaces such as a flat surface or a quadric surface, and approximately with respect to boundary shape elements which can be expressed by a free-form surface or a discrete point group).

For example, the space is hierarchically divided into eight parts until two points on one line segment become cut points 15 on the edge line of the cell in case of one line segment, until three points become the cut points in case of a flat surface, until three points become cut points in case of a quadratic curve, until four points become cut points in case of a quadratic surface, and until necessary and sufficient points and the edge line of the cell can be found in a defined range in cases where the expression of the external data is known with respect to each of a polynomial surface and a rational expression surface.

That is, division is carried out until a position to be subjected to subdivision satisfies a specified resolution at a boundary (surface) part or until a rate of change of a value of an analysis result (a stress, a distortion, a pressure, a flow velocity or the like) becomes lower than a specified threshold value.

Further, as to salient points 16 (indicated by black circles in the drawing) of the cell 13b including a plurality of the boundary shape elements, the boundary therein can be indirectly expressed as an intersecting line of the boundary expressed by the cut point 15 held by an adjacent boundary cell (which has the cut points sufficient for reconfiguration and is divided until the boundary elements completely come across), and hence subdivision is not carried out more than needs.

Therefore, the V-CAD data 14 becomes, as information concerning the shapes stored inside the cell, an index indicating a position of the cell, the division number or a resolution indicating a degree of detail in the hierarchy, a pointer indicating an adjacent cell, the number of cut points, coordinate values of the cut points and so on. Further, depending on use application, the V-CAD data 14 can become a normal line, a curvature or the like.

Furthermore, as the V-CAD, node information or values of the result are held in the form of Euler in the lowermost layer. How to determine a threshold value (limit deviation tolerance) concerning the continuity of each of a position of the boundary, a normal line, a tangent line and the curvature is defined in such a manner that the minimum resolution in subdivision becomes as large as possible.

Figure 5A:
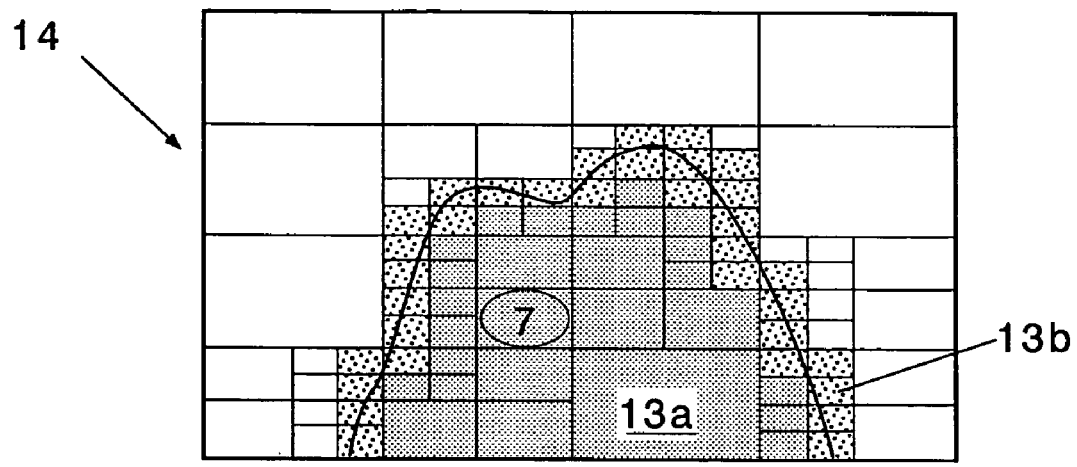
FIGS. 5A and 5B are type drawings of the rapid prototyping method according to the present invention.
Figure 5B:
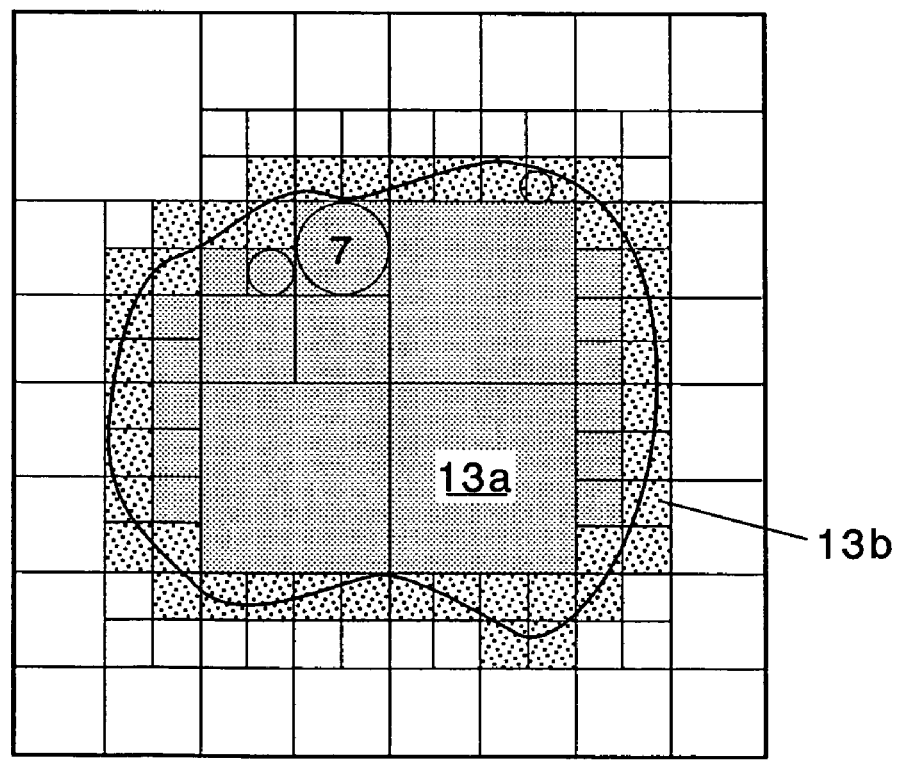

FIGS. 5A and 5B are type drawings showing the prototyping method according to the present invention. In the prototyping method according to the present invention, the above-described prototyping apparatus is used to generate the V-CAD data obtained by dividing external data 12 consisting of boundary data of the object 1 into rectangular parallelepiped cells 13 having boundary planes orthogonal to each other in accordance with octree division and separating the respective divided cells into the internal cells 13a positioned on the inner side of the object and the boundary cells (13b) including the boundary face.

FIG. 5A is a side view showing the object 1 in the form of V-CAD data, and FIG. 5B is a plane view of the same. As shown in the drawings, the V-CAD data of the object 1 can be separated into the internal cells 13a and the boundary cells 13b.

In the method according to the present invention, the modeling unit quantity of the prototyping material 7 is changed in accordance with sizes of the internal cell 13a and the boundary cell 13b of the modeling portion and set in such a manner that the prototyping material 7 does not protrude from the boundary plane of a corresponding cell.

According to the method and the apparatus of the present invention mentioned above, since the V-CAD is stored, which is obtained by dividing the external data 12 of the object 1 into rectangular parallelepiped cells 13 having boundary planes orthogonal to each other in accordance with the octree division and separating the respective divided cells into the internal cells 13a positioned on the inner side of the object and the boundary cells 13b including the boundary face, the external data 12 can be stored with a small storage capacity as a hierarchy of the cells.

Furthermore, since the program used to manufacture the object by rapid prototyping is generated based on the V-CAD data, the program can be simplified. Moreover, since the modeling unit quantity of the prototyping material 7 is changed in accordance with sizes of the cells 13a and 13b of the object (modeling portion) and this material is laminated so as not to protrude from the boundary planes of the cells with a relatively large agglomerate of the material which substantially corresponds to a capacity of each cell being determined as a modeling unit, the number of all the cells is small and the number of laminations is thus small, thereby greatly reducing the model production time.

As described above, the rapid prototyping method and apparatus using the V-CAD data according to the present invention have the excellent advantages such as simplification of the program for rapid prototyping and great reduction in the model production time.

It is to be noted that the material to adhere for modeling may be caused to adhere in, e.g., the ink jet manner in order to avoid protrusion from the cell. Moreover, by selecting a material which is solidified in a relatively short time, it can be built up without flowing out after adhesion.

It is to be noted that the present invention has been described with reference to the several preferred embodiments but it can be understood that scope of the claims included in the present invention is not restricted to these embodiments. On the contrary, the scope of the claims of the present invention includes all improvements, modifications and equivalents included in the appended claims.

The invention claimed is:

1. A rapid prototyping method using V-CAD data, comprising the steps of:
   preparing V-CAD data obtained by dividing external data consisting of boundary data of an object into rectangular parallelepiped cells having boundary planes orthogonal to each other in accordance with octree division and separating the respective divided cells into internal cells positioned on the inner side of the object and boundary cells including a boundary face; and
   changing a modeling unit quantity of a prototyping material per cell in accordance with sizes of the internal cell and the boundary cell of a modeling portion allowing the thickness of the prototyping material to vary per cell.

2. The rapid prototyping method according to claim 1, wherein the prototyping material is a resin, lumber powder, a low-fusing-point metal, metal powder, ceramics powder, or a mixture of a binder and one of these materials.

3. The rapid prototyping method according to claim 1, wherein a modeling unit quantity of the prototyping material is set in such a manner that the modeling unit quantity is smaller than a capacity of the corresponding internal cell and does not protrude from the boundary plane of the cell.

4. A rapid prototyping apparatus using V-CAD data, comprising:

a storage device which stores V-CAD data obtained by dividing external data consisting of boundary data of an object into rectangular parallelepiped cells having boundary planes orthogonal to each other in accordance with octree division and separating the respective divided cells into internal cells positioned on the inner side of the object and boundary cells including a boundary face;

a data generation program which generates a program used to manufacture the object from the V-CAD data by rapid prototyping;

a material supply device which changes a modeling unit quantity of a prototyping material per cell in accordance with sizes of the internal cell and the boundary cell of a modeling part and supplies the prototyping material allowing the thickness of the prototyping material to vary per cell; and an NC control device which controls the material supply device based on the data generation program.

5. The rapid prototyping method according to claim 1, wherein a modeling unit quantity of the prototyping material is set in such a manner that the modeling unit quantity is smaller than a capacity of the corresponding boundary cell and does not protrude from the boundary plane of the cell.

* * * * *